April 26, 1932.  F. I. KAMINSKI  1,855,762
CHRISTMAS TREE HOLDER
Filed May 17, 1930
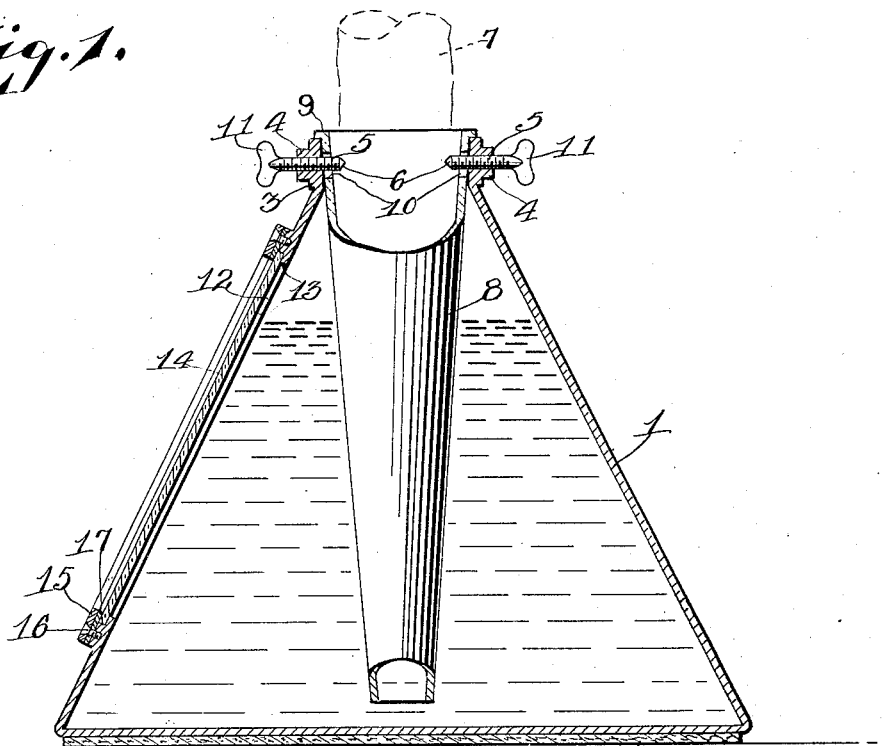
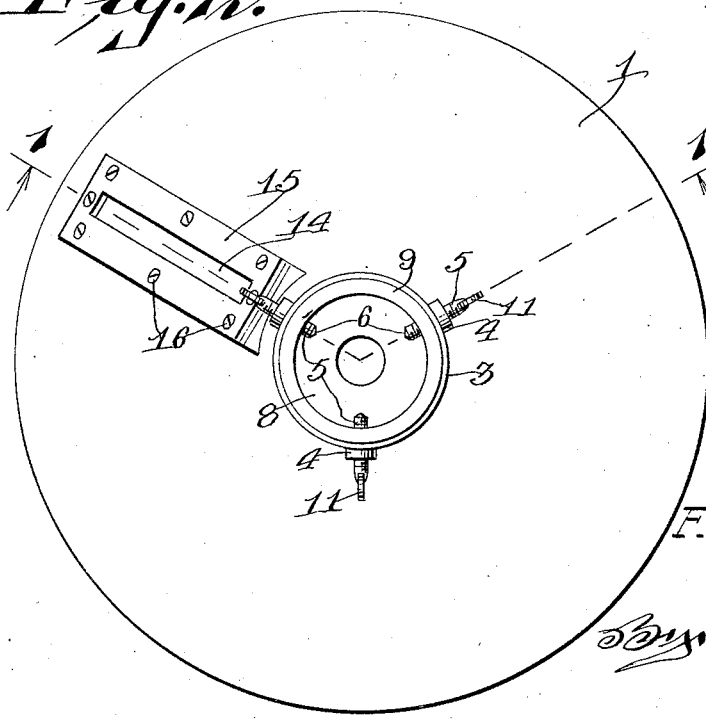
Inventor
F. I. Kaminski Patented Apr. 26, 1932

1,855,762

UNITED STATES PATENT OFFICE

FRANK I. KAMINSKI, OF LOHRVILLE, WISCONSIN

CHRISTMAS TREE HOLDER

Application filed May 17, 1930. Serial No. 453,233.

This invention relates to improvements in Christmas tree holders.

One of the objects of my invention is the provision of a Christmas tree stand or holder which is so constructed as to not only support the tree in an upright position, but for the purpose of retaining a water supply around the base of the tree, so as to preserve the life-like appearance of the tree while the same is retained in the holder.

Another object of the invention is the provision of a Christmas tree holder and stand which includes a receptacle having inclined walls, which assist the usual supporting element for retaining the tree in an upright position and provide a retaining socket for the base of the tree which is disposed within the container, and includes means for securely fastening the socket and container in position with respect to the base of the tree, so that the base of the tree is positioned within the container and in contact with the water therein.

A still further object of the invention is the provision of a Christmas tree holder which includes a container having a relatively large base, with the side walls tapering inwardly to form a restricted neck portion in which is fitted a socket for the base of the tree, and includes adjustable screw members carried by the restricted neck of the container adapted to pass through suitable openings in the socket for retaining the socket in position and engaging the base of the tree.

A still further object of the invention is the provision of a Christmas tree stand and holder which includes in its construction a base-like container for containing water in which the base of the tree is disposed for preserving the life-like appearance of the tree, and wherein the side wall of the base container is provided with a side opening so as to ascertain whether or not a sufficient amount of water is in the base for engagement with the lower end of the tree.

With the above and other objects in view, the invention consists in the novel features of construction, the combination and arrangement of parts hereinafter more fully set forth, pointed out in the claim and shown in the accompanying drawings wherein:

Figure 1 is a sectional view on the line 1—1 of Figure 2, with parts of the device illustrated in elevation;

Figure 2 is a top plan view.

Referring more particularly to the drawings, it will be noted that 1 indicates a conical-like base container, having arranged upon the bottom thereof a layer of felt or other suitable material, as shown at 2, whereby the base container can be rested upon a highly polished floor without injuring the floor in any way whatever.

The base member is provided at its upper end with a restricted reinforced neck portion 3, having bosses 4 at spaced intervals around the neck, and these bosses are provided with internally threaded openings which extend through the neck of the container and are adapted to receive the adjustable screw members 5 provided with tapering points 6 at their inner ends which are adapted to engage the base of the tree illustrated at 7.

Positioned within the base container is a conical-like receiving member 8 for the base of the tree. This member 8 is opened at its lower end, as illustrated in Figure 1, and has at its upper end an annular flange 9 adapted to rest upon the upper edge of the reinforced neck portion 3 for supporting this member in the position illustrated in Figure 1.

The receiving member 8 is provided adjacent its upper end with oppositely disposed openings 10 through which the screw members 5 project for retaining this receiving member 8 in proper position relative to the base container. The outer ends of the screw members 5 are provided with wing portions 11, whereby these screw members may be manipulated by hand for adjusting them inwardly and outwardly on the neck 3.

In order to provide means whereby a person may ascertain whether or not the proper amount of water is contained within the base 1, the inclined side wall of the base is provided at one side with an opening 12 having a flange 13 projecting around the openings upon which is rested the edges of a transparent plate 14, said plate being held in position by means of a clamping frame 15 attached to the wall of the base member by means of screw member 16, and positioned between the clamping frame and the glass panel 14 is a layer of felt indicated at 17, or this layer may be of rubber or any other suitable material to form a water tight connection around the panel 14.

It will be apparent from the foregoing that I have provided a simple and inexpensive Christmas tree stand or holder, wherein the base or the lower end of the tree can be inserted within the receiving member 8 and then this receiving member inserted into the base container through the neck portion 3, and as soon as the flange 9 is in position, resting upon the upper edge of the neck 3, the screw members 5 can be turned inwardly with the pointed ends 6 penetrating the base of the tree, at which time the receiving member 8, as well as the tree, will be maintained in an upright position, it being understood that the base container is filled with water before the lower end of the tree is inserted therein.

The device is extremely simple in construction, and it is thought that it can be manufactured and placed on the market at a very low cost.

While I have shown and described the preferred embodiment of my invention, it will be apparent that slight changes may be made in the construction when putting the invention into practice without departing from the spirit of the same or the scope of the appended claim.

I claim:

A Christmas tree holder comprising a frusto-conical water receptacle having an annular reinforcing neck on its upper end provided at spaced points with internally threaded bosses, an inverted hollow frusto-conical trunk support snugly received within said reinforcing neck and having its opposite ends opened, the tapered end being disposed innermost and terminating short of the bottom of the receptacle, an annular supporting flange formed on the upper end of the trunk support engaging said neck, the trunk support adjacent to said flange being provided with enlarged openings registering with said internally threaded bosses, and adjusting screws carried by said bosses movable into and out of the trunk support through said openings.

In testimony that I claim the foregoing I have hereunto set my hand at Lohrville, in the county of Waushara and State of Wisconsin.

FRANK I. KAMINSKI.